Dec. 28, 1937. M. I. EDDY 2,103,408
CLASSROOM COMMITTEE TABLE
Filed Nov. 12, 1936

Inventor
MILDRED I. EDDY.
By Hiram A. Sturges
Attorney

Patented Dec. 28, 1937

2,103,408

UNITED STATES PATENT OFFICE 2,103,408

CLASSROOM COMMITTEE TABLE

Mildred I. Eddy, Omaha, Nebr.

Application November 12, 1936, Serial No. 110,432

2 Claims. (Cl. 45—6)

This invention relates to a classroom committee table for use in high schools, grade schools or other educational institutions, and used by groups of students or others for committee work requiring concentrated thought and study in solving problems and rendering written reports or findings on subjects alotted to the group or committee.

The table to be described, specifically, is for use of pupils sufficiently advanced in their grades to be able to independently carry on investigations relating to assigned subjects pertaining to the sciences, arts, history and practical subjects generally, and to orally discuss and render written reports of their findings of facts relating to the assigned subject.

The plan includes such an arrangement that opportunity for investigation or research of each given subject will be uniform for the several groups of the class or grade, and includes assemblages of the several groups, these occasions being for tests or recitations, at which time each group will be called upon to render its report of its findings on the subject or problem which had been assigned to it, subject to the oral criticism of any member or members of the other groups as to correctness, and thereby operating as a stimulus for correct work, and tending to create competition among the several groups of the class.

In the practice of this plan, while each group of pupils may consist of any suitable number, I have found that each group should work at a single table and that the pupils for a group should not exceed five in number, and in order that the work, as outlined, may be carried on to advantage I have produced the committee table now to be described, claimed and illustrated in the accompanying drawing, it being understood that I may make changes in form, size, proportion of parts and minor details, said changes being within the scope of the invention as claimed.

Figure 1:
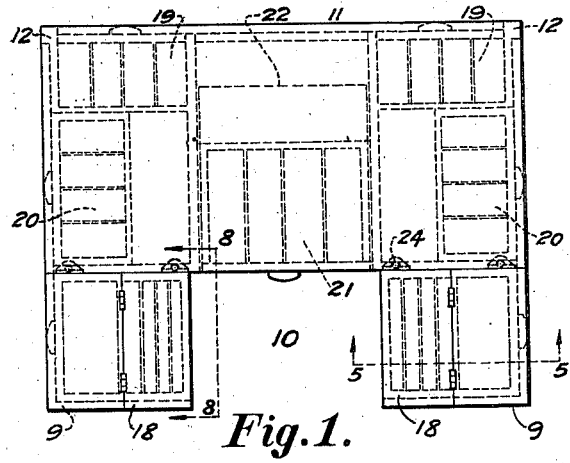
Figure 2:
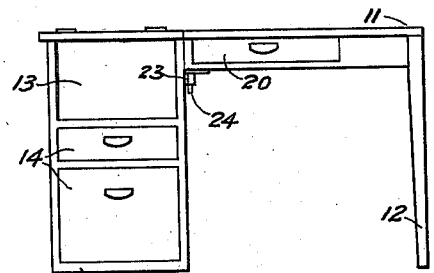
Figure 3:
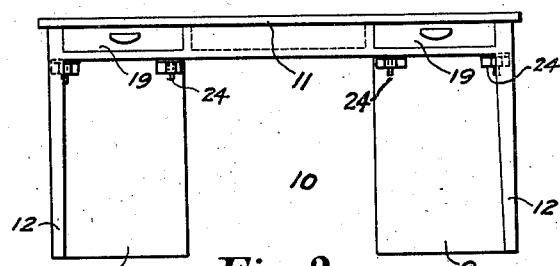
Figure 5:
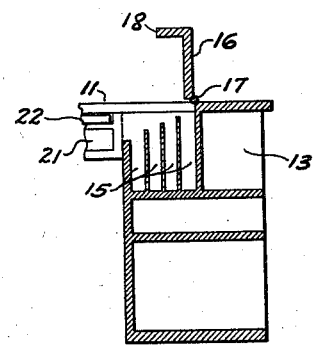
Figure 4:
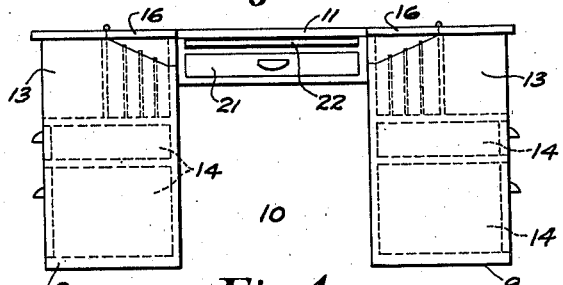

In the drawing, Fig. 1 is a plan view of the table. Fig. 2 is a side view and Fig. 3 is a front view of the table. Fig. 4 is a rear view of the table and Fig. 5 is a transverse section on line 5—5 of Fig. 1, a lid being shown in elevated position and the drawers being omitted.

Figure 8:
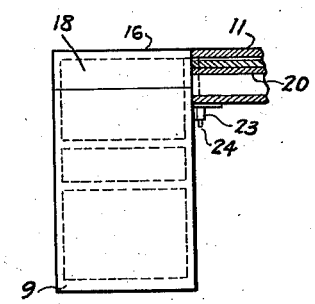
Figures 6, 7:
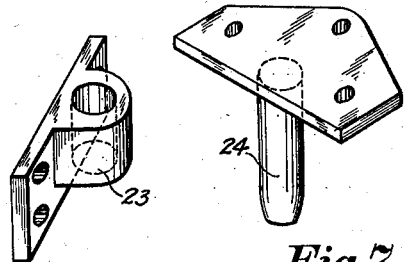

Figs. 6 and 7 are perspective views of a pair of coupling-members, and Fig. 8 is a transverse section on line 8—8 of Fig. 1.

Referring now to the drawing for a more particular description in which like numerals of reference indicate like parts, I provide a pair of upright casings 9, preferably of rectangular or box like form, said casings being disposed relatively parallel and in spaced relation to provide a recess 10 therebetween.

Numeral 11 indicates a flat table-member which extends horizontally and forwardly from the ends of the casings and from the tops of said casings, said member 11 being provided with a pair of legs 12, and it will be understood that when these parts are disposed upon a floor or similar support, the top surfaces of members 9 and 11 will be disposed in a single plane.

The table-member 11 is of such proportions that two persons may be seated at the front, and each side of said member provides ample space for a single student, and the recess 9 may be occupied by the chairman of the committee or group, five chairs (not shown) being provided for seating the members of said group.

In order that the work of research and investigation may be carried on to advantage, each casing 9 is provided with a compartment 13 which opens on the outer side thereof for containing books, and is provided below said compartment with suitable drawers 14, best shown in Fig. 2, for containing records and supply-paper.

In order that the chairman may have convenient means for referring to records, the inner side of each casing 9 is provided with a plurality of vertical compartments 15 varying in depth as best shown in Fig. 5, lids 16 being hinged at 17 to the top of the casings for covering said vertical compartments, each lid being provided with a right-angled flange 18, and when the lids are closed, the flanges 18 will be disposed in line with the inner, vertical walls of said casings, each inner wall of a casing 9 having a lesser height than its other vertical wall, and having such proportions that the flange 18 may engage the top of said inner wall when the lid is closed.

Since the vertical compartments 15 are of varying depths, and since the inner side walls of the casings are of lesser height than the height of the casings, it may be said that the vertical compartments 15 open upon both the recess 10 and top of the casings when the lids 16 are swung to elevated position, this being of great advantage as a matter of convenience for the chairman of the committee.

As best shown in Fig. 3, each student at the front of the table is provided with a drawer 19, and at 20 (Fig. 2) are indicated drawers which open on the sides of the table-member 11, each drawer being divided as shown by dotted lines in Fig. 1, to provide small stalls or compartments for holding various kinds of writing materials.

The table-member 11 is also provided with a drawer 21 which opens into the recess 10 for use of the chairman of the group or committee, and also is provided with a slide plate 22 which is mounted above and is movable parallel with this drawer, this slide-plate operating as a rearward extension for the table-member 11, and useful for the same purposes, for work thereon, as said table-member 11, and the chairman, therefore, may have use, separately, of the drawer 21 or slide-plate 22.

The table as described is approximately of horseshoe form, and while it may be manufactured as a unit, it may also consist of detachable parts for convenience and as an economical feature for shipments from the factory, and cost of manufacture, and therefore sockets 23 are provided in pairs for the front ends of each casing 9 (Figs. 2, 5) near the upper parts thereof, and locking-pins 24 are secured to the bottom of the table-member 11 for detachable engagements in the socket-members 23, and in operation, these parts may be readily assembled or disconnected as may be required.

It is desirable that the entire top of the table shall present a smooth surface, and therefore said members 23 and 24 are disposed below the member 11, and the hinges 17 for the lids 16 should be countersunk.

Among some of the advantages derived by use of the invention, it provides a table of such arrangement that the group of students will be assembled as a unit for concentrated work; also its use results in more or less physical exercise since books of reference are stored on the shelves of compartments 13 at the sides of the table, sufficiently remote to require limited travel of a student to the supply-shelves, and thereby tending to avoid the objectionable confinement and continued physical inactivity heretofore generally practiced in schools.

The arrangement of the table for use of the chairman who occupies a chair (not shown) in the recess 10 will be appreciated; the students of a group, during assemblages, will be located at approximately uniform distances from the leader or chairman, and the view between them will be unobstructed, these advantages being largely due to the form and construction of the table and particularly due to the provision of the recess 10. Also the fact that the vertical compartments 15, for receiving reference records, open at various heights upon the recess 11 and top of the casings, is a matter of great advantage to facilitate the work of the chairman and to operate as a time-saver for the group.

I claim as my invention:—

1. A classroom committee table comprising a pair of upright casings rectangular in plan and elevation disposed with their sides relatively parallel and spaced apart to provide a recess therebetween, each casing having a plurality of vertical compartments varying in length opening on its top and said recess, a pair of swingable lids for covering said compartments, a table-member rectangular in plan extending from the ends of the casings, the top surfaces of the table-member and casings being disposed in a single plane, one side of said table member extending along a side of one of said casings, across said recess and along the corresponding side of the other casing, means to secure said side to said casings for support thereof, and legs for supporting the opposite side of said table.

2. A classroom committee table comprising a pair of upright casings disposed side by side in spaced relation to provide a recess therebetween, each casing being provided with socket-members on one of its sides near the top thereof and compartments opening on another side, an upright table-member provided with drawers in its side, and locking-pins along one side thereof, said table-member being adapted to be disposed in abutting position upon said recess with its top surface in alinement with the top surfaces of the casings, its locking-pins engaging in the socket-members of said casings to support one side thereof, and legs for supporting the opposite side thereof.

MILDRED I. EDDY.